United States Patent [19]

Murano et al.

[11] Patent Number: 5,362,565
[45] Date of Patent: Nov. 8, 1994

[54] PRODUCTION METHOD OF MICROCAPSULES

[75] Inventors: Tsutomu Murano; Toshifumi Nishikubo, both of Shinjuku, Japan

[73] Assignee: Nippon Paper Industries Co., Ltd., Tokyo, Japan

[21] Appl. No.: 59,603

[22] Filed: May 12, 1993

[30] Foreign Application Priority Data

May 13, 1992 [JP] Japan .................. 4-120474

[51] Int. Cl.$^5$ ............................ B32B 5/16; B32B 9/04
[52] U.S. Cl. ............... 428/402.2; 428/402.21; 264/4.7; 503/215
[58] Field of Search ............... 428/402.2, 402.21; 264/4.7; 503/215

[56] References Cited

U.S. PATENT DOCUMENTS 5,061,410 10/1991 Sakamoto et al. ............. 428/402.21

Primary Examiner—John Kight, III
Assistant Examiner—Duc Truong
Attorney, Agent, or Firm—Sherman and Shalloway

[57] ABSTRACT

A production method of microcapsules using a copolymer including at least three types of monomers including 50 to 90 by weight of acrylic acid, 2 to 40% by weight of an acrylamidealkylsulfonic acid such as acrylamidepropanesulfonic acid, and 2 to 15% by weight of an alkylacrylate such as butylacrylate as an anionic water-soluble polymer as an emulsifier and a reaction promoter for a core substance of the microcapsules, whereby obtaining microcapsules for use in pressure-sensitive copy paper having wall films of an amine-aldehyde condensation polymer which reduces spot staining generated when the capsules are used in pressure-sensitive copy paper by reducing coarse particles present in traces in the microcapsule slurry.

13 Claims, No Drawings

PRODUCTION METHOD OF MICROCAPSULES

FIELD OF THE INVENTION

This invention relates to microcapsules having amine-aldehyde condensation polymer wall films used for the purpose of converting or controlling properties in the areas of pharmaceuticals, agrochemicals, perfumes, liquid crystals, pressure-sensitive copy paper, heat-sensitive copy paper and the like, more specifically, to a production method of microcapsules having amine-aldehyde condensation polymer wall films which are particularly effective for use in pressure-sensitive paper.

DESCRIPTION OF THE PRIOR ART

This invention belongs to a chemical method to form microcapsule wall films comprising an amine-aldehyde condensation polymer only from one of continuous phase, that is, an in-situ polymerization method.

Methods in which amine and aldehyde are used as wall film formation materials are described, for example, in Japanese Patent Publications 37-12380, 44-3495, and 47-23165. However, these methods involve disadvantages in that emulsification and dispersion are not efficient, or it is difficult to build up a polymer around a hydrophobic substance efficiently and stably.

As an anionic polymer which improves such problems, use of an acrylic polymer or an acrylic acid copolymer is disclosed in Japanese Patent Publication 54-16949, Japanese Patent Laid-open Publications 58-14942, 59-142836, 60-28819, 60-68045, 60-190227, 60-216839, 60-238140, 61-11138, 61-17491, 62-19238, 62-57645, 62-97638, 62-250943, and 63-134084.

However, these technologies have the following problems which have yet to be improved. In Japanese Patent Publication 54-16949, build-up efficiency of a condensation polymer around a core substance has been improved, but the resulting capsule slurry has a very high viscosity. Furthermore, Japanese Patent Laid-open Publications 58-14942, 59-142836, and 60-68045 disclose production of a slurry which is high concentration, low-viscosity and good in particle size distribution of the slurry, however, the slurry viscosity in high concentration is not sufficiently low to be satisfactory. When anionic polymers disclosed in Japanese Patent Laid-open Publications 60-28819, 60-190227, 60-216838, 60-238140, 61-11138, 61-17491, 62-19238, 62-57645, 62-97638, 62-250943, and 63-134084 are used, high-concentration, low-viscosity capsule slurries can be obtained in all cases, however, when capsules obtained by these methods are used in pressure-sensitive copy paper, they are defective in that staining degree is high with respect to color development, because the particle size distribution of the capsules is broad, or, if not so, they are still dissatisfactory in terms of staining (spot staining) generated on the pressure-sensitive copy paper. In particular, spot staining is notable in self-contained pressure-sensitive copy paper.

OBJECT OF THE INVENTION

It is a primary object of the present invention to provide improvement to a production method of microcapsules by an in-situ polymerization method to form microcapsule wall films comprising an amine-aldehyde condensation polymer by a reaction from only one of continuous phases, which can reduce spot staining when used in pressure-sensitive copy paper by reducing traces of coarse particles present in the capsule slurry, and to propose a production method of microcapsules in which emulsification power is high, emulsified particles during reaction are good in stability, and the resulting microcapsules are good in particle size distribution and density of capsule walls, good in workability, and superior in overall properties.

SUMMARY OF THE INVENTION

The inventors have conducted intensive studies in solving the above problems and achieved a production method of microcapsules in which capsules having wall films of an amine-aldehyde condensation polymer are formed in a system of a hydrophobic core substance dispersed or emulsified in an acid aqueous solution containing an anionic water-soluble polymer, characterized in that the anionic water-soluble polymer is a copolymer comprising at least three types of monomers of acrylic acid, acrylamidealkylsulfonic acid, and alkyl acrylate. Furthermore, a better result has been obtained by using a water-soluble polymer which is a copolymer comprising at least one monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate, in addition to acrylic acid, acrylamidealkylsulfonic acid, and alkylacrylate.

Monomer composition of the water-soluble polymer according to the present invention is 50–90 weight % of acrylic acid, 2–40 weight % of acrylamidealkylsulfonic acid, 2–15 weight % of alkylacrylate, and 0–15 weight % of at least one monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate, more preferably, 60–80 weight % of acrylic acid, 5–30 weight % of acrylamidealkylsulfonic acid, 3–10 weight % of alkylacrylate, and 2–10 weight % of at least one monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate. The copolymer of the present invention may be in the form of non-salt or partly salt, preferably a sodium, potassium, or lithium salt.

To obtain the copolymer of the present invention, it is preferable to use a radical polymerization method in an aqueous medium, which is a conventional polymerization method of acrylic acid in which a mixture of acrylic acid, acrylamidealkylsulfonic acid, and alkylacrylate, and as needed at least one monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate, in addition to acrylic acid, acrylamidealkylsulfonic acid, and alkylacrylate is placed in a vessel, after air in the vessel is purged with nitrogen gas, an organic or inorganic peroxide or persulfate is added as a polymerization initiator, and heated to polymerize. After completion of the reaction, part of the copolymer may be neutralized with an alkali such as caustic soda as needed. When radical polymerization is carried out in an aqueous medium, the copolymer is generally obtained as an aqueous solution containing 5–30 weight % of non-volatiles. It is practically convenient to handle the aqueous solution in the form of normally 20 weight % of non-volatiles and PH value of 1 to 4. Normally, the viscosity is preferably 100–5,000 cps for a solution of 20 weight % of non-volatiles at 25° C. and a pH value of 3.1, measured by a B-type viscometer, more preferably 300–1,000 cps. If the viscosity is less than 100 cps, the particle size distribution tends to become broader and the content of coarse particles tends to increase. On the other hand, if the viscosity is higher than 5,000 cps, since the viscosity during the reaction and that of the capsule slurry are high, it is not suitable for use in pressure-sensitive copy paper for which a low-viscosity slurry is favored.

The acrylamidealkylsulfonic acid used in the present invention can be acrylamideethylpropane-sulfonic acid, acrylamidepropanesulfonic acid, 2-acrylamide-2-methylpropanesulfonic acid, acrylamidebutane-sulfonic acid, acrylamideethansulfonic acid, and the like, and, of these, it is preferable to use 2-acrylamide-2-methylpropanesulfonic acid (hereinafter referred to as AMPS) in view of availability of the monomer and copolymerizability.

The alkylacrylate is one of which the alkyl is at least one selected from those of straight or branched chain types having 1 to 10 carbon atoms, more preferably, methylacrylate, ethylacrylate, propylacrylate, butylacrylate, amylacrylate, or hexylacrylate.

The production method of microcapsules according to the present invention basically comprises the following steps:

(1) Preparation of the Core Substance

A hydrophobic liquid for the core substance of capsules is used alone, or as needed in combination with other substances dissolved in the hydrophobic liquid by heating and stirring, to prepare the core substance.

(2) Preparation of Continuous Phase

The water-soluble polymer of the present invention is dissolved in water at room temperature, in which an amine or an initial condensate of amine and aldehyde is dissolved to obtain a continuous phase. The initial condensate may be modified with phenols or benzoguanamine or the like. The ratio of the wall film material and the core substance is 1: 1–20 in solid weight, and the water-soluble polymer of the present invention is used in an amount of 0.5 to 7 weight % of the entire capsule production system. Depending on the type of the water-soluble polymer, the type of the wall film formation material, the type of the core substance, and the purpose of encapsulation, the water-soluble polymer is used preferably in an amount of 1 to 5 weight % of the entire capsule production system. The amine and aldehyde as wall film formation materials can be used alone or as a prepolymer dissolved in the continuous phase. The amine of the present invention is selected from urea, thiourea, and melamine, alkylated products of these with an alkyl of 1–4 carbon atoms, methylolated products of these, alkylated methylolated products of these with an alkyl of 1–4 carbon atoms and mixtures thereof. Of these substances, it is preferable to use at least one of melamine, methylolmelamine, methylated methylolmelamine, urea, dimethylolurea, and methylated methylolurea.

(3) Emulsification

While agitating the continuous phase, the core substance solution is added to the continuous phase, and emulsified by an emulsifying machine such as a homogenizer, a stationary mixer, or the like. Better particle size distribution is obtained by carrying out the emulsification at room temperature or a lower temperature.

(4) Capsule Wall Formation Reaction

When emulsified particles of a predetermined particle diameter are obtained, pH value of the emulsified solution is adjusted in a range for condensation polymerization of the wall film materials used. In general, this reaction is preferably carried out in an acid condition to obtain a dense wall film. In view of the fact that the lower the pH value, the faster the reaction, but too violent reaction disturbs formation of uniform capsule wall, the pH value is adjusted to approximately 3. Ratio of the amine and aldehyde depends on the types of the individual materials and cannot be determined wholly, but normally 0.5 to 5.0 moles of aldehyde is used to 1 mole of amine. For the case of urea and formaldehyde, it is preferable to use 1.2 to 3.0 moles of formaldehyde to 1 mole of urea. Heating is started simultaneously with the completion of emulsification or the addition of the aldehyde. Heating is achieved to 35 to 90° C., and is normally adjusted to 50° to 80° C. After reaching the setting temperature, it is necessary to maintain at the setting temperature for more than a predetermined period of time, and for a reaction at 50° to 60 C., it is preferable to maintain the temperature for at least 1 hour.

(5) Post-Treatment

After the completion of encapsulation, concentration adjustment, pH adjustment, washing, filtration, drying, pulverization, and the like are performed according to the purpose. When formaldehyde is used as the aldehyde, treatment is performed to reduce excess formaldehyde which is usually present in the slurry. This is achieved by using a substance having active hydrogen such as ammonia, urea, sulfite, hydrogensulfite, ethyleneurea, hydroxyamine salt, methylacetoacetate, or the like, used alone or in combination. Furthermore, chemical removing methods using many types of carbonates in combination, and physical removing methods such as steam distillation, ultrafiltration, and the like are proposed, which may be used appropriately.

Although detail behaviors of the individual monomers are unknown, in the polymerization, the acrylic acid enhances stability of emulsified particles in the emulsification stage and the capsule wall formation reaction (hereinafter referred to as emulsification stability) and promotes the capsule wall formation reaction to give a capsule slurry of reduced agglomerations, however, use of a single monomer is insufficient in terms of the actions, resulting in a capsule slurry of a relatively high viscosity containing coarse particles. The capsule wall film is dense but relatively soft. The acrylamidealkylsulfonic acid promotes the capsule wall formation reaction and gives a capsule slurry with a narrow particle size distribution and low viscosity, but the capsule wall film is relatively hard and low in density. The alkylacrylate does not promote the capsule wall formation reaction, does improve the emulsification and dispersing effect, and is effective to reduce coarse particles, however, use in excess tends to broaden the particle size distribution, increase the capsule slurry viscosity, and cause agglomeration of capsules during the capsule wall formation reaction.

When acrylic acid, acrylamidealkylsulfonic acid, and alkylacrylate are used in combination, reduction in coarse particles is remarkable as compared to the use of two. This is considered as due to a comprehensive balance between the effect of hydrophilicity of the carboxyl group of acrylic acid and the sulfonic group of acrylamidealkylsulfonic acid and the effect of hydrophobic groups such as alkyl and acrylamidealkyl. Furthermore, by using at least one monomer selected from the group consisting of methacrylic acid, alkylmethacrylate, hydroxyalkylacrylate, hydroxyalkylmethacrylate, acrylamide, methacrylamide, succinic ester of hydroxyalkylacrylate, succinic ester of hydroxyalkylmethacrylate, and vinylacetate as needed, improvement in capsule wall formation rate, particle diameter distribution adjustment of emulsified particles, adjustment of density and rigidity of capsule wall films, adjustment of capsule slurry viscosity, and the like can be achieved.

DESCRIPTION OF THE PREFERRED EMBODIMENTS

Examples and comparative examples of the present invention will now be described in order to further clarify the effect of the present invention, however, the present invention is not limited to these examples. Part and % used in the examples indicate part by weight and % by weight, respectively.

EXAMPLE 1

550 g of water was charged in a 2-liter flask provided with a reflux cooler, a thermometer, a nitrogen inlet tube, and two dropping funnels, and heated to 85° to 88° C. under stirring. Separately, 36 g of 2-acrylamide-2-methylpropanesulfonic acid was dissolved in 150 g of water, mixed with 14.5 g of 48% NaOH to neutralize, and a mixture of 216 g of acrylic acid and 25 g of butylacrylate (solution A) and 2.22 g of potassium persulfate dissolved in 100 g water (solution B) were prepared. The solution A and the solution B were individually charged in the separate dropping funnels and dropped at the same temperature over a period of 1.5 hours. After that, the reaction mixture was maintained at the same temperature for 4 hours, and then cooled. Further, 7.5 g of 48% NaOH and water was added to obtain an anionic water-soluble polymer having a composition of acrylic acid/2-acrylamide-2-methylpropanesulfonic acid/butylacrylate=78/13/9 and a concentration of 20%. The product had a viscosity of 710 cps.

35 parts of the water-soluble polymer obtained in the above production example was diluted with 80 parts of water, and 10 parts urea and 1.2 parts of resorcinol were mixed, and the pH value of the mixture was adjusted to 3.4 with an aqueous caustic soda solution. Separately, 135 parts of a high-boiling solvent (Nippon Petrochemicals, Hisol SAS-296) mainly comprising phenylxylylethane was mixed with 5 parts of Crystal Violet Lactone and dissolved by heating and stirring at 100° C. After dissolution, the solution was cooled to room temperature, mixed into the previously prepared water-soluble polymer-containing aqueous solution taking care of phase transition, and emulsified by agitating by the Homomixer Model M (Tokushukika) at 10,000 rpm for 3 minutes to obtain a stable O/W emulsion with an average particle diameter of 3.6μm. The emulsion was mixed with 70 parts of dilution water and 23.5 parts of 37% formaldehyde, heated, and after the temperature reached 55° C., the capsule film formation reaction was continued for 2 hours. When a small amount of the resulting capsule solution was put into a 20% aqueous resorcinol solution and stirred to observe the completeness of the capsule wall, no change was noted (incomplete capsule wall formation indicates a blue color) and dense wall films were formed.

To reduce residual formaldehyde, after cooling to 30° C., the capsule solution was mixed with 29% ammonia water until the pH value is 7.5 to obtain a capsule slurry for pressure-sensitive copy paper.

EXAMPLE 2

A water-soluble polymer was prepared using the same procedure as in Example 1, except that 9 parts of ethylacrylate was used in place of 9 parts of butylacrylate. A capsule slurry was produced using this water-soluble polymer and the same procedure as in Example 1.

EXAMPLE 3

A water-soluble polymer was prepared using the same procedure as in Example 1, except that 9 parts of propylacrylate was used in place of 9 parts of butylacrylate. A capsule slurry was produced using this water-soluble polymer and the same procedure as in Example 1.

EXAMPLE 4

A water-soluble polymer was prepared using the same procedure as in Example 1, except that 65 parts of acrylic acid, 30 parts of AMPS, and 5 parts of butylacrylate were used in place of 78 parts of acrylic acid, 13 parts of AMPS, and 9 parts of butylacrylate. A capsule slurry was produced using this water-soluble polymer and tile same procedure as in Example 1.

EXAMPLE 5

A water-soluble polymer was prepared using the same procedure as in Example 1, except that 88 parts of acrylic acid, 7 parts of AMPS, and 5 parts of butylacrylate were used in place of 78 parts of acrylic acid, 13 parts of AMPS, and 9 parts of butylacrylate. A capsule slurry was produced using this water-soluble polymer and the same procedure as in Example 1.

EXAMPLE 6

A water-soluble polymer was prepared using the same procedure as in Example 1, except that 78 parts of acrylic acid, 13 parts of AMPS, 6 parts of butylacrylate, and 3 parts of 2-hydroxyethylmethacrylate were used in place of 78 parts of acrylic acid, 13 parts of AMPS, and 9 parts of butylacrylate. A capsule slurry was produced using this water-soluble polymer and tile same procedure as in Example 1.

EXAMPLE 7

A water-soluble polymer was prepared using the same procedure as in Example 1, except that 78 parts of acrylic acid, 13 parts of AMPS, 6 parts of butylacrylate, and 3 parts of methylmethacrylate were used in place of 78 parts of acrylic acid, 13 parts of AMPS, and 9 parts of butylacrylate. A capsule slurry was produced using this water-soluble polymer and the same procedure as in Example 1.

EXAMPLE 8

A water-soluble polymer was prepared using the same procedure as in Example 1, except that 78 parts of acrylic acid, 13 parts of AMPS, 3 parts of butylacrylate, 3 parts of 2-hydroxyethylmethacrylate, and 3 parts of methylmethacrylate were used in place of 78 parts of acrylic acid, 13 parts of AMPS, and 9 parts of butylacrylate. A capsule slurry was produced using this water-soluble polymer and the same procedure as in Example 1.

COMPARATIVE EXAMPLE 1

A water-soluble polymer was prepared using the same procedure as in Example 1, except that 90 parts of acrylic acid and 10 parts of butylacrylate were used in place of 78 parts of acrylic acid, 13 parts of AMPS, and 9 parts of butylacrylate. A capsule slurry was produced using this water-soluble polymer and the same procedure as in Example 1.

COMPARATIVE EXAMPLE 2

A water-soluble polymer was prepared using the same procedure as in Example 1, except that 87 parts of acrylic acid and 13 parts of AMPS were used in place of 78 parts of acrylic acid, 13 parts of AMPS, and 9 parts of butylacrylate. A capsule slurry was produced using this water-soluble polymer and the same procedure as in Example 1.

COMPARATIVE EXAMPLE 3

A water-soluble polymer was prepared using the same procedure as in Example 1, except that 84 parts of acrylic acid, 8 parts of styrenesulfonic acid, and 8 parts of butylacrylate were used in place of 78 parts of acrylic acid, 13 parts of AMPS, and 9 parts of butylacrylate. A capsule slurry was produced using this water-soluble polymer and the same procedure as in Example 1.

COMPARATIVE EXAMPLE 4

A water-soluble polymer was prepared using the same procedure as in Example 1, except that 75 parts of acrylic acid, 13 parts of styrenesulfonic acid, 6 parts of 2-hydroxyethylmethacrylate, and 6 parts of methylmethacrylate were used in place of 78 parts of acrylic acid, 13 parts of AMPS, and 9 parts of butylacrylate. A capsule slurry was produced using this water-soluble polymer and the same procedure as in Example 1.

Test Methods

The capsule slurries obtained in the above Examples and Comparative Examples were tested by the following test methods, and the test results are shown in Table 1.

Viscosity: Viscosity of the capsule slurry was measured at 25° C. by a B-type rotary viscometer.

Emulsification property: Emulsification was carried out under the same condition, and average volume particle diameter after 3 minutes of emulsification was measured by the ELZONE Particle Counter Model 80XY particle diameter measuring instrument. The smaller the value, the better the emulsification property.

Emulsion stability: Average volume particle diameter of capsule particles after encapsulation was measured by the ELZONE Particle Counter Model 80XY particle diameter measuring instrument, and emulsion stability was evaluated from the difference between average volume particle diameter of capsule particles and average volume particle diameter of emulsified particles. The smaller the value, the better the emulsion stability.

Particle size distribution: Emulsification and encapsulation were carried out under the same condition, average volume particle diameter was measured by the ELZONE Particle Counter Model 80XY particle diameter measuring instrument, and particle size distribution was represented by 10 times the logarithm of particle diameter ratio of 25% volume point to 75% volume point. The smaller the value, the narrower the particle size distribution.

Coarse particles: The produced capsule slurry was diluted to 20%, coated on a coated front (hereinafter referred to as CF) paper of pressure-sensitive copy paper (Jujo Paper, CCP ACE W-40BL) using No. 20 meyer bar, dried, and the number of spot-like colored staining appearing on the CF paper in an area of 15×20 cm was counted. Coarse particles of greater than 20 $\mu$m appear as spot-like staining on the CF paper.

Film density: The capsule slurry was diluted to 20%, coated on a CF paper of pressure sensitive copy paper (Jujo Paper, CCP ACE W-40BL) using No. 14 meyer bar, dried in a 150° C. oven for 1 minute, allowed to stand for 1 hour, and reflectance of the coated surface was measured by a Hunter reflectometer (Toyo Seiki Seisakusho). Difference in reflectance between uncoated CF paper and the coated CF paper was used as an index of film density. The value is small for good film density since reduction in reflectance is small. For practical use, it is preferable that the value is 5% or less.

TABLE 1

| | Water-soluble polymer vis. 25° C., cps | Slurry vis. 25° C., cps | Emulsified solution av. particle diameter $\mu$m | Capsule av. particle diameter $\mu$m | Particle size distribution | Spot-like staining (pieces) | Film density % |
|---|---|---|---|---|---|---|---|
| Example | | | | | | | |
| 1 | 710 | 436 | 3.6 | 3.8 | 1.86 | 3 | 3.0 |
| 2 | 680 | 413 | 4.1 | 4.2 | 1.98 | 4 | 3.3 |
| 3 | 662 | 380 | 4.1 | 4.3 | 1.99 | 4 | 3.8 |
| 4 | 460 | 555 | 3.8 | 4.0 | 2.01 | 4 | 3.3 |
| 5 | 705 | 310 | 4.2 | 4.3 | 2.03 | 4 | 3.9 |
| 6 | 600 | 328 | 4.0 | 4.0 | 1.81 | 3 | 3.2 |
| 7 | 580 | 270 | 4.1 | 4.2 | 1.92 | 3 | 3.7 |
| 8 | 800 | 224 | 4.3 | 4.5 | 1.83 | 4 | 2.6 |
| Comp. Example | | | | | | | |
| 1 | 890 | 230 | 3.5 | 4.0 | 2.32 | over 50 | 3.9 |

TABLE 1-continued

| | Water-soluble polymer vis. 25° C., cps | Slurry vis. 25° C., cps | Emulsified solution av. particle diameter μm | Capsule av. particle diameter μm | Particle size distribution | Spot-like staining (pieces) | Film density % |
|---|---|---|---|---|---|---|---|
| 2 | 490 | 1100 | 6.3 | 6.5 | 2.16 | 47 | 7.6 |
| 3 | 1050 | 260 | 3.3 | 3.4 | 2.32 | 14 | 3.1 |
| 4 | 1325 | 310 | 5.8 | 6.2 | 1.76 | 11 | 3.0 |

It can be seen from Table 1 that the Examples using the anionic water-soluble polymer according to the present invention contain almost no coarse particles evaluated as spot-like staining as compared to Comparative Examples 1, 3, and 4 which use prior art water-soluble polymers. From comparison of Comparative Examples 1 and 2 with Example 1, it is clearly shown that, whereas Comparative Examples 1 and 2 using acrylic acid and butylacrylate or AMPS are inferior in spot-like staining, Example 1 which uses the three substances in combination is remarkably improved in spot-like staining, conspicuously showing the effect of the use of three in combination.

In the Comparative Examples, the anionic water-soluble polymers used in Comparative Examples 1, 3, and 4 are individually those disclosed in the inventions of Japanese Patent. Laid-open Publication 60-68045, Japanese Patent Laid-open Publication 62-19238, and Japanese Patent Laid-open Publication 58-1492.

By virtue of use of the anionic water-soluble polymer according to the present invention, microcapsules can be easily produced with almost no coarse particles evaluated as spot staining, the emulsification property-, particle size distribution, and slurry viscosity on satisfactory levels, and improved density of capsule wall films.

We claim:

1. A method of producing microcapsules having wall films of an amine-aldehyde condensation polymer comprising forming said wall film in a system of a hydrophobic core substance dispersed or emulsified in an acid aqueous solution containing an anionic water-soluble polymer, wherein said anionic water-soluble polymer is a copolymer comprising at least monomers of acrylic acid, acrylamidealkylsulfonic acid, and alkyl acrylate.

2. The method of claim 1 wherein said antionic water-soluble polymer is a copolymer comprising at least on additional monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate.

3. The method of claim 1 or claim 2 wherein said amine-aldehyde condensation polymer comprises at least one amine selected from the group consisting of melamine, methylolmelamine, methylated methylolmelamine, urea, dimethylolurea, and methylated dimethylolurea; and formaldehyde.

4. A method of producing amine-aldehyde condensation polymer films on the walls of microcapsules having a hydrophobic core which comprises dispersing or emulsifying said microcapsules in an aqueous acid solution containing an anionic water-soluble polymer comprising 50–90 wt. % acrylic acid, 2–40 wt. % acrylamidealkylsulfonic acid and 2–15 wt. % alkyl acrylate monomers.

5. The method of claim 4 wherein the alkyl in the acrylamidealkylsulfonic acid is $C_2$ to $C_5$ alkyl, and the alkyl in the alkyl acrylate is $C_1$ to $C_6$ alkyl.

6. The method of claim 4 wherein the alkyl in the acrylamidealkylsulfonic acid is methylpropane, and the alkyl in the alkyl acrylate is $C_2$ to $C_4$ alkyl.

7. The method of claim 4 wherein said anionic water-soluble polymer is a copolymer comprising 0–15 wt. % of at least one additional monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate.

8. The method of claim 4 or claim 7 wherein said amine-aldehyde condensation polymer comprises at least one amine selected from the group consisting of melamine, methylolmelamine, methylated methylolmelamine, urea, dimethylolurea, and methylated dimethylolurea; and formaldehyde.

9. A method of producing amine-aldehyde condensation polymer films on the walls of microcapsules having a hydrophobic core which comprises dispersing or emulsifying said microcapsules in an aqueous acid solution contain an anionic water-soluble polymer comprising 60–80 wt. % acrylic acid, 5–30 wt. % acrylamidealkylsulfonic acid and 3 to 10 wt. % alkyl acrylate monomers.

10. The method of claim 9 wherein the alkyl in the acrylamidealkylsulfonic acid is $C_2$ to $C_5$ alkyl, and the alkyl in the alkyl acrylate is $C_1$ to $C_4$ alkyl.

11. The method of claim 9 wherein the alkyl in the acrylamidealkylsulfonic acid is methylpropane, and the alkyl in the alkyl acrylate is $C_2$ to $C_4$ alkyl.

12. The method of claim 9 wherein said anionic water-soluble polymer is a copolymer comprising 2 to 10 wt. % of at least one additional monomer selected from the group consisting of methacrylic acid, alkylmethacrylate, hydroxyalkylacrylate, hydroxyalkylmethacrylate, acrylamide, methacrylamide, succinic acid ester of hydroxyalkylacrylate, succinic acid ester of hydroxyalkylmethacrylate, and vinylacetate, in addition to acrylic acid, acrylamidealkylsulfonic acid, and alkylacrylate.

13. The method of claim 9 or claim 12 wherein said amine-aldehyde condensation polymer comprises at least one amine selected from the group consisting of melamine, methylolmelamine, methylated methylolmelamine, urea, dimethylolurea, and methylated dimethylolurea; and formaldehyde.

* * * * *